(12) United States Patent
Bucur et al.

(10) Patent No.: US 10,873,079 B2
(45) Date of Patent: Dec. 22, 2020

(54) LOW RESISTANCE, MULTIVALENT METAL ANODES

(71) Applicant: Toyota Motor Engineering & Manufacturing North America, Inc., Erlanger, KY (US)

(72) Inventors: Claudiu B. Bucur, Ypsilanti, MI (US); John G. Muldoon, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1364 days.

(21) Appl. No.: 14/753,467

(22) Filed: Jun. 29, 2015

(65) Prior Publication Data

US 2016/0380268 A1 Dec. 29, 2016

(51) Int. Cl.
*H01M 4/46* (2006.01)
*H01M 4/36* (2006.01)
*H01M 4/38* (2006.01)
*H01M 4/48* (2010.01)
*H01M 4/50* (2010.01)
*H01M 4/60* (2006.01)
*H01M 4/62* (2006.01)
*H01M 10/05* (2010.01)
*H01M 10/0569* (2010.01)
(Continued)

(52) U.S. Cl.
CPC .......... *H01M 4/466* (2013.01); *H01M 4/366* (2013.01); *H01M 4/38* (2013.01); *H01M 4/483* (2013.01); *H01M 4/505* (2013.01); *H01M 4/5815* (2013.01); *H01M 4/5825* (2013.01); *H01M 4/602* (2013.01); *H01M 4/624* (2013.01); *H01M 4/625* (2013.01); *H01M 10/054* (2013.01); *H01M 10/0569* (2013.01); *H01M 2220/20* (2013.01); *H01M 2300/0028* (2013.01)

(58) Field of Classification Search
CPC ............. H01M 4/466; H01M 10/0569; H01M 10/054; H01M 4/366; H01M 4/38; H01M 4/625; H01M 4/602; H01M 2004/027
See application file for complete search history.

(56) References Cited

U.S. PATENT DOCUMENTS

| | | | |
|---|---|---|---|
| 4,844,996 A | | 7/1989 | Peled et al. |
| 5,453,297 A | * | 9/1995 | Dye ...................... B22F 1/0018 427/217 |

(Continued)

FOREIGN PATENT DOCUMENTS

WO    WO 0109972    *   2/2001    ............ H01M 10/40

OTHER PUBLICATIONS

Rieke, Reuben D., "Preparation of highly reactive metal powders and their use in organic and organometallic synthesis", Accounts of Chemical Research 10 (8): 301-306 (1977).*

(Continued)

*Primary Examiner* — Maria Laios
*Assistant Examiner* — Angela J Martin
(74) *Attorney, Agent, or Firm* — Oblon, McClelland, Maier & Neustadt, L.L.P.

(57) ABSTRACT

A low resistance multivalent metal anode is provided. The metal is present in the anode as a Riecke highly active particle. Anode resistivity of 1000 $\Omega \cdot cm^2$ or lower can be obtained. Metals employed include magnesium, calcium, zinc and aluminum. Electrochemical cells containing the low resistance multivalent metal anodes are also provided.

16 Claims, 3 Drawing Sheets

(51) Int. Cl.
*H01M 10/054* (2010.01)
*H01M 4/58* (2010.01)
*H01M 4/505* (2010.01)

(56) References Cited

U.S. PATENT DOCUMENTS

| | | | | |
|---|---|---|---|---|
| 5,964,919 | A * | 10/1999 | Rieke | C07B 49/00 |
| | | | | 516/33 |
| 6,045,942 | A * | 4/2000 | Miekka | H01M 6/40 |
| | | | | 429/124 |
| 7,070,882 | B1 | 7/2006 | Ferrando | |
| 8,932,764 | B2 * | 1/2015 | Yushin | H01M 4/38 |
| | | | | 429/218.1 |
| 9,012,086 | B2 * | 4/2015 | Singh | H01M 4/381 |
| | | | | 429/188 |
| 9,142,834 | B2 * | 9/2015 | Mohtadi | C01B 6/246 |
| 10,125,429 | B2 * | 11/2018 | McDonald | B22F 9/24 |
| 2010/0021799 | A1 * | 1/2010 | Rieke | H01M 2/08 |
| | | | | 429/50 |
| 2014/0356724 | A1 | 12/2014 | Iwami | |
| 2016/0308248 | A1 * | 10/2016 | Burrell | H01M 10/0569 |

OTHER PUBLICATIONS

Furstner, Alois, Active Metals: Preparation, Characterization, Applications, 1995, VCH Publishers, pp. 1-55. (Year: 1995).*

Rieke, Reuben, et al., Reike Metals: Highly Reactive Metal Powders Prepared by Alkali Metal Reduction of Metal Salts, 1996, Active Metals, pp. 1-59. (Year: 1996).*

* cited by examiner

LOW RESISTANCE, MULTIVALENT METAL ANODES

BACKGROUND OF THE INVENTION

Lithium-ion batteries represent state of the art power source technology and their usage is an integral part of modern applications based on rechargeable batteries such as cell phones, laptops, hybrid electric vehicles and electric vehicles. Researchers continue to make advancements in lithium-ion technology. However, lithium is of low abundance leading to high cost and even with recent advancements, the range of a battery in an electric car is less than 150 miles per charge. Technologists have targeted 300 miles as a range for a battery to make an electric car which is competitive with a combustion engine vehicle.

In searching for replacement systems for lithium based batteries, members of the research community have turned their interests to multivalent metals to prepare rechargeable batteries with higher capacities than a lithium battery. Multivalent metals such as for example, magnesium, calcium, zinc and aluminum offer the possibility of storage of more charge per unit volume than lithium. Thus, magnesium has a theoretical capacity of 3832 mAh/ml in comparison to 2061 mAh/ml for lithium. Calcium has a volumetric capacity of 2073 mAh/ml and additionally has a very high melting point of 838° C., in contrast to lithium at 180.5° C. which would offer increased safety due to less risk of thermal runaway. Additionally, metals such as magnesium, calcium, zinc and aluminum are much more abundant than lithium and therefore, a battery based on one of these metals would be expected to have a much lower cost. However, success with multivalent metals requires significant advancement in electrolyte and cathode active material development.

Magnesium metal is receiving significant study as a metal for the next generation of ion batteries which in addition to lower cost and increased capacity appears to offer increased battery safety in comparison to lithium. Lithium anodes suffer from a phenomenon of dendrite growth upon charge and discharge of the battery. These dendrites or needle-like growths which form and project from the anode surface into the electrolyte and approach the cathode lead to short circuiting of the battery, thus degradation and possible explosion. Magnesium does not appear to form dendrites upon repeated charge discharge cycles.

However, magnesium and other multivalent metals present other technical challenges which prevent direct replacement for lithium in a battery structure. Redox metals chemically interact with electrolytes and are believed to decompose the electrolyte to form an interface layer on the surface of the metal. In the case of lithium this layer is referred to as the solid electrolyte interface (SEI) and for lithium it is believed the SEI protects further electrolyte from degradation. The SEI is permeable to lithium ion and thus the SEI is a beneficial structure. In contrast, with magnesium metal the interface layer formed due to electrolyte degradation is impermeable to magnesium ions and thus prevents reversible electrochemical dissolution and plating of magnesium on the anode. Similar results have been obtained with other multivalent metal ions. Thus, unlike lithium the layer formed passivates the cell and is considered a "blocking layer."

Accordingly, successful development of a magnesium battery requires the identification of an electrolyte system which enables reversible magnesium ion insertion or absorption and release. To this goal, researchers have studied Grignard systems and systems of related chemical structures. However, many of these systems are not compatible with the cathodic active materials and suitable combinations of magnesium compatible electrolytes and cathode active materials are the subject of ongoing research.

Additionally, to date, magnesium metal batteries continue to suffer from high resistance due to the passivation layers which form on the magnesium metal anode. Currently, metallic anodes are highly polished magnesium sheets which may have a resistance of as high as 400,000 $\Omega \cdot cm^2$. FIG. 1 shows the impedance spectra of a polished magnesium foil with multiple polish steps. The first spectrum has a resistance of ~200,000 $\Omega \cdot cm^2$ and the $10^{th}$ spectrum has a resistance of 400,000 $\Omega \cdot cm^2$. This greatly affects the performance practicality of a magnesium battery and it is crucial that a low resistance magnesium metal anode is discovered for the coupling with high capacity cathodes. Similar effects are also expected for other multivalent metals including Ca, Zn and Al.

Therefore, one object of this application is to provide a multivalent metal anode material which exhibits significantly less resistance in comparison to conventional polished multivaent metal foil electrodes.

Another object is to provide a method to prepare electrodes containing multivalent metal active materials having significantly less resistance in comparison to conventional polished multivalent metal foil electrodes.

A further object is to provide a battery containing an anode composed of the low resistance multivalent metal material.

SUMMARY OF THE INVENTION

These and other objects are provided by the subject matter of this application, the first embodiment of which includes a negative electrode comprising a current collector and Rieke active multivalent metal particles as an active ingredient.

In one embodiment, the Rieke multivalent metal particles are selected from the group consisting of magnesium, zinc, calcium and aluminum.

In a further embodiment an electrochemical cell comprising a negative electrode having Rieke multivalent metal particles as an active ingredient is provided.

In one explicit embodiment a negative electrode containing a current collector and Rieke active magnesium particles as an electrode active component is provided.

In a further embodiment a magnesium battery is provided. The magnesium battery comprises: an anode; a cathode; and an electrolyte comprising magnesium ions; wherein the anode comprises a current collector; and Rieke active magnesium particles.

The forgoing description is intended to provide a general introduction and summary of the present invention and is not intended to be limiting in its disclosure unless otherwise explicitly stated. The presently preferred embodiments, together with further advantages, will be best understood by reference to the following detailed description taken in conjunction with the accompanying drawings.

DETAILED DESCRIPTION OF THE PREFERRED EMBODIMENTS

Applicants are actively investigating all aspects of electrochemical systems which have the potential to supplant lithium ion batteries, especially to systems which may provide battery power systems for vehicles capable of traveling 300 miles on one battery charge. Due to capability to transfer more than one electron in a redox electron transfer, interest has been directed to metals capable to form multivalent cations such as the alkaline earth metals and selected transition metals which have chemical configurations similar to the alkaline earth metals, for example zinc. Applicants have surprisingly discovered a method to prepare metal anodes of multi-valent metals of significantly lower resistance in comparison to anodes prepared by traditional polishing techniques. In the case of magnesium, a technique to prepare a low resistance magnesium metal anode which may have a resistance as low as 400 $\Omega \cdot cm^2$ is provided. Thus, a magnesium anode having a resistance comparable with the resistance of a conventional lithium metal anode may be provided.

Figure 1:
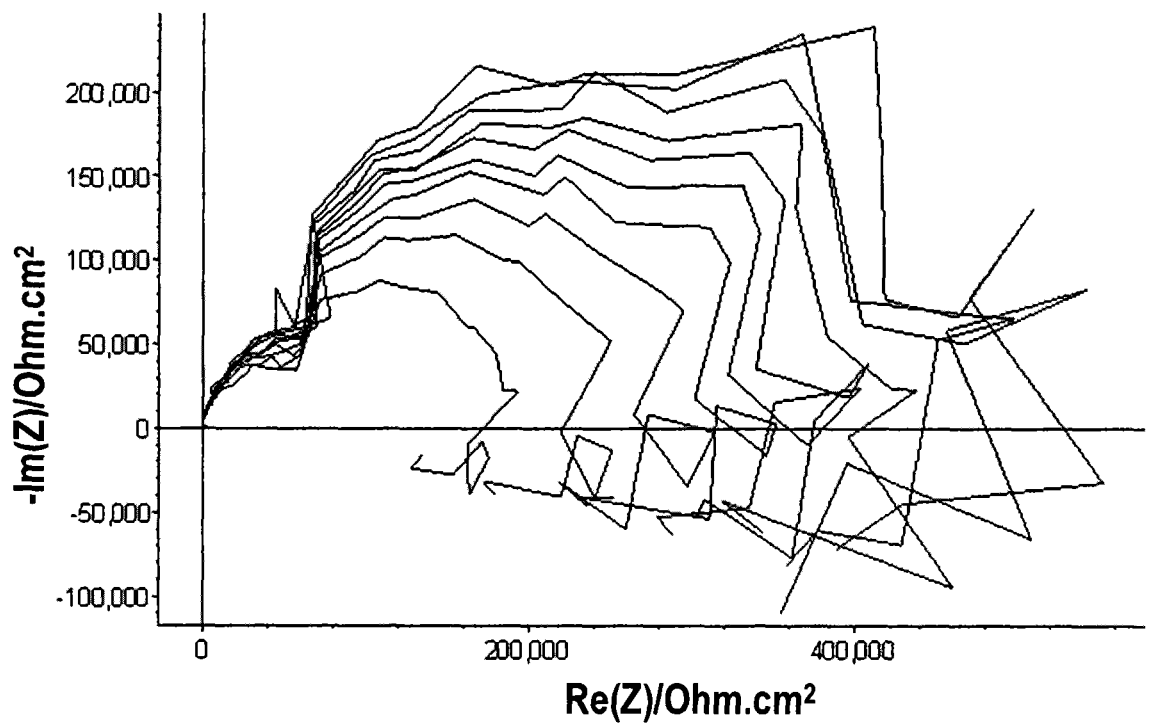
FIG. 1 shows the change of impedance spectra of a magnesium foil with number of polish treatments.
Figure 2:
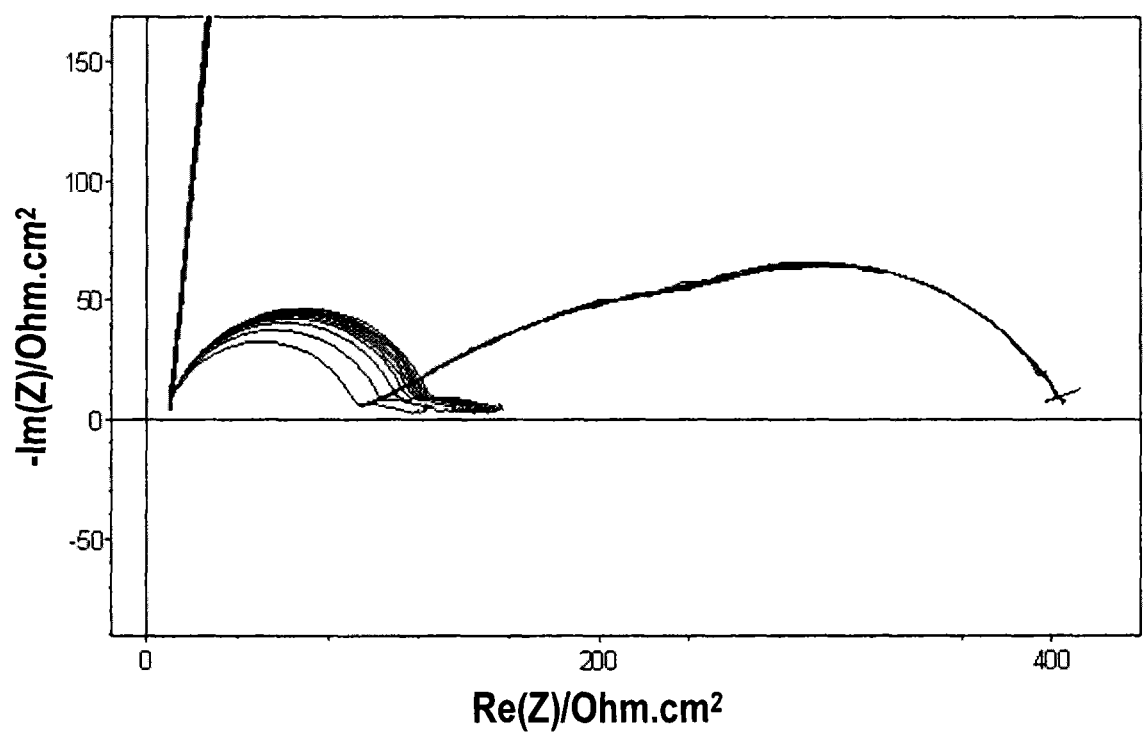
FIG. 2 shows impedance spectra of low resistance magnesium metal anode according to an embodiment disclosed in this application.

One common method to "activate" a metal anode is to scratch or abrade it under an inert atmosphere. While this method works quite well for treating magnesium electrodes with a small surface area such as those used for three electrode cyclic voltammetry experiments, it still results in very high impedance for higher surface area foils such as magnesium foils used in coin cells or pouch cells. FIG. 1 shows the effect of multiple polishing of a magnesium foil and it can be seen that such treatment is not effective to yield a metal with resistance comparable to lithium. Similar results would be expected for calcium, zinc and aluminum.

In consideration of Grignard organometallic chemistry where activation of metals for reactions with high thermodynamic thresholds is necessary, Applicants have surprisingly discovered that a surprisingly low resistance magnesium anode may be prepared with magnesium particles obtained from reduction of metal salts as described by R. D. Rieke (Preparation of Highly Reactive Metal Powders and Their Use in Organic and Organometallic Synthesis. Acc. Chem. Res. 1977, 10 (8), 301-306).

Rieke described the preparation of active metal particles obtained by reduction of dissolved metal salts in an ether or hydrocarbon solvent using an alkali metal as the reducing agent. The reduced metal may be obtained as a finely divided black powder via the method described by Rieke or in some cases purchased commercially as a slurry in THF (for example, Rieke active magnesium Mg*®). Rieke described that the magnesium particles have an average size of 15 mμ and that particle size can be influenced by addition of KI. The particles have high surface area and are in the metallic zero valent state.

An anode paste may be prepared under inert atmosphere with a 1.0 to 15% by weight based on the weight of the total anode material of a binder such as poly-vinylidene fluoride (PVdF) dissolved in THF. Preferably, the content of the binder may be from 2.5 to 10%, more preferably 3 to 8% and most preferably 4 to 6% by weight. Some conductive carbon may be added if needed. For example, 0.5 to 25% by weight based on the final weight of the anode material. This range includes all subranges within the original range. The paste may then be coated onto a current collector such as carbon paper/graphite foil or aluminum and cut into disks to be used in battery cells. The impedance of such magnesium electrodes in symmetrical cells may be 1000 $\Omega \cdot cm^2$ or less, preferably less than 600 $\Omega \cdot cm^2$ and most preferably 400 $\Omega \cdot cm^2$ or less, very much in line with the resistance of lithium metal anodes.

One problem encountered in previous experimental design and testing of magnesium battery systems was that the high resistance of the polished magnesium foil prevented facile and accurate evaluation of cathode active materials. With a magnesium anode according to this embodiment, practical testing of cathodes in cells with magnesium metal anodes may now be possible. Metallic anodes of zinc, calcium, aluminum, etc., may also be prepared via the methods described above.

In another embodiment a rechargeable battery having an anode comprising a Rieke active multivalent metal, a cathode compatible with the anode and an electrolyte composition suitable for the anode/cathode combination is provided.

In the case of a magnesium battery, the cathode active material may be selected from metal oxides such as $MnO_2$, $V_2O_5$, or hollandite's of titanium or vanadium. Other positive electrode active materials may include elemental sulfur, Chevrel phase $Mo_6S_8$, CuS, $Cu_2S$, $Ag_2S$, $CrS_2$, $VOPO_4$, layered structure compounds such as $TiS_2$, $MgVO_3$, $MoS_2$, $MgV_2O5$, $MoO_3$, Spinel structured compounds such as $CuCr_2S_4$, $MgCr_2S_4$, $MgMn_2O_4$, $Mg_2MnO_4$, NASICON structured compounds such as $MgFe_2(PO_4)_3$ and $MgV_2(PO_4)_3$, Olivine structured compounds such as $MgMnSiO_4$ and $MgFe_2(PO_4)_2$, Tavorite structured compounds such as $Mg_{0.5}VPO_4F$, pyrophosphates such as $TiP_2O_7$ and $VP_2O_7$, and fluorides such as $FeF_3$. As indicated above, due to the low resistivity of the magnesium anode disclosed herein, cathode active materials bypassed by researchers in the past will need to be re-evaluated.

In one embodiment the cathode may be constructed of encapsulated sulfur sub-micron particles as described in U.S. patent application Ser. No. 14/489,597, filed Sep. 18, 2014. Thus, the cathode active material may include a core-shell sub-micron particle, comprising a core of elemental sulfur; and a shell comprising a first layer closest to the sulfur core of ionically charged, self-assembling conductive copolymer having at least one hydrophobic region; and at least a second conductive polymer layer having an electrical charge opposite to the first layer adjacent to and ionically bonded with the first layer. At least one of the core and surface of an outer layer may comprise a functionalized conductive carbon material.

The cathode active material may be present as a sheet, ribbon, particles, or other physical form. An electrode containing the cathode active material may be supported by a current collector. A current collector may include a metal or other electrically conducting sheet on which the electrode is supported. The current collector may be formed of carbon, carbon paper, carbon cloth or a metal or noble metal mesh or foil.

The cathode active material may further include an electrically conductive material and a binder. Examples of electrically conducting materials include carbon black, Super P, Super C65, Ensaco black, Ketjen black, acetylene black, synthetic graphite such as Timrex SFG-6, Timrex SFG-15, Timrex SFG-44, Timrex KS-6, Timrex KS-15, Timrex KS-44, natural flake graphite, carbon nanotubes, fullerenes, hard carbon, and mesocarbon microbeads. Example binders include poly-vinylidene fluoride (PVdF), poly(vinylidene fluoride-co-hexafluoropropene) (PVdF-HFP), Polytetrafluoroethylene (PTFE), Kynar Flex 2801, Kynar Powerflex LBG, and Kynar HSV 900, and Teflon. Poly-vinylidene fluoride (PVdF) is a preferred binder.

An electrolyte layer may be disposed between the anode and cathode and may include a separator which helps maintain electrical isolation between the positive and negative electrodes. A separator may include fibers, particles, web, porous sheet, or other forms of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent selected from the group consisting of tetrahydrofuran, 2-methyl tetrahydrofuran, dimethoxyethane, glyme, monoglyme, dimethyl glycol, dimethyl ether, diethyl ether, ethyl glyme, diglyme, proglyme, ethyl diglyme, triglyme, butyl diglyme, tetraglyme, polyglyme, highlyme, and combinations thereof.

Halide containing solvents and halide salts are preferably not included.

Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt. In one aspect, the electrolyte may include HMDSMgCl—$AlCl_3$ in THF, PhMgCl—$AlCl_3$ in THF. Examples of electrolyte systems which may be suitable are described in U.S. Pat. Nos. 8,354,193 and 8,318,354.

Figure 3:
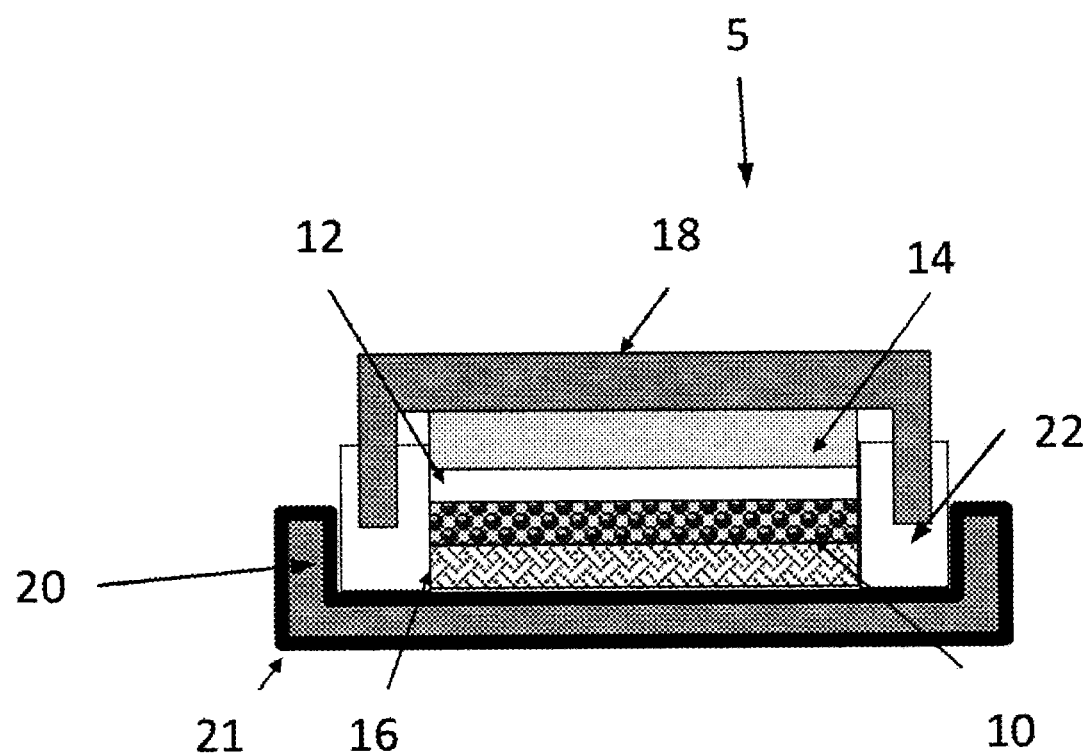
FIG. 3 shows a diagram of a magnesium battery according to one embodiment of the invention.

FIG. 3 shows an example of one configuration of a rechargeable magnesium cell 5. The cell 5 includes a positive electrode 10 comprising a cathode active material, an electrolyte layer 12, a negative electrode 14, a cathode current collector 16, a negative electrode housing 18, a positive electrode housing 20 including an inert layer 21, and a sealing gasket 22. The electrolyte layer 16 may include a separator soaked in electrolyte solution, and the positive electrode 10 may be supported by the cathode current collector 16. The negative electrode 14 includes an active material of a multivalent Rieke active magnesium metal according to the embodiments described above.

In one embodiment, the cathode of the magnesium battery may comprise the encapsulated sulfur sub-micron particles as described in U.S. patent application Ser. No. 14/489,597.

The ether solvent may be one or more of tetrahydrofuran, ethylene glycol dimethyl ether and bis 2-methoxy ethyl ether in consideration of utility in a battery, safety and ease of handling. Tetrahydrofuran may be most preferred, although battery construction and requirements may dictate the necessity for an ether with different physical properties.

The Mg battery may be constructed by methods which are conventionally known and may be a button or coin cell battery consisting of a stack of negative electrodes, porous polypropylene or glass fiber separators, and positive electrode disks in a can base onto which a can lid is crimped. Alternatively, the Mg battery may be a stacked cell battery. In other embodiments, the Mg battery may be a prismatic, or pouch, cell consisting of one or more stacks of negative electrode, porous polypropylene or glass fiber separator, and positive electrode sandwiched between current collectors, as described above. The stack(s) may be folded within a polymer coated aluminum foil pouch, vacuum and heat dried, filled with electrolyte, and vacuum and heat sealed. In other embodiments, the Mg battery may be a prismatic, or pouch, bi-cell consisting of one or more stacks of a positive electrode which is coated with active material on both sides and wrapped in porous polypropylene or glass fiber separator, and a negative electrode folded around the positive electrode. The stack(s) are folded within a polymer coated aluminum foil pouch, dried under heat and/or vacuum, filled with electrolyte, and vacuum and heat sealed. In some embodiments of the prismatic or pouch cells described herein, an additional tab composed of a metal foil or carbonaceous material may be affixed to the current collector by laser or ultrasonic welding, adhesive, or mechanical contact, in order to connect the electrodes to the device outside the packaging. In other embodiments, the Mg battery disclosed herein is a wound or cylindrical cell consisting of wound layers of one or more stacks of a positive electrode which is coated with active material on one or both sides, sandwiched between layers of porous polypropylene or glass fiber separator, and a negative electrode. The stack(s) are wound into cylindrical roll, inserted into the can, dried under heat and/or vacuum, filled with electrolyte, and vacuum and welded shut. In some embodiments of the cylindrical cells described herein, an additional tab composed of a metal foil or carbonaceous material may be affixed to the current collector by laser or ultrasonic welding, adhesive, or mechanical contact, in order to connect the electrodes to the device outside the packaging.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A negative electrode (anode) for a nonaqueous battery comprising a current collector and Rieke active metal particles in a metallic zero valent state as an active ingredient; wherein the Rieke active metal is selected from the group consisting of magnesium, calcium and aluminum.

2. The negative electrode of claim 1 wherein the Rieke metal particles are magnesium particles.

3. The negative electrode of claim 2, wherein an impedance is 1000 $\Omega \cdot cm^2$ or less.

4. The negative electrode of claim 1 further comprising from 1 to 15% by weight based on the anode material of a binder.

5. The negative electrode of claim 1 further comprising a conductive carbon.

6. The negative electrode of claim 2 further comprising at least one of a binder and a conductive carbon.

7. A battery comprising: an anode of claim 1; a cathode; and a nonaqueous electrolyte; wherein the anode contacts the nonaqueous electrolyte.

8. The battery of claim 7, wherein the Rieke active metal particles are magnesium particles.

9. The magnesium battery of claim 8, wherein the cathode comprises an active material selected from the group consisting of $MnO_2$, $V_2O_5$, a titanium hollandite, a vanadium hollandite, elemental sulfur, Chevrel phase $Mo_6S_8$, CuS, $Cu_2S$, $Ag_2S$, $CrS_2$ and $VOPO_4$.

10. The magnesium battery of claim 8, wherein the cathode comprises:
core-shell sub-micron particles, the sub-micron particles comprising:
a core comprising elemental sulfur; and
a shell comprising a first layer closest to the sulfur core of ionically charged, self-assembling conductive copolymer having at least one hydrophobic region; and
at least a second conductive polymer layer having an electrical charge opposite to the first layer adjacent to and ionically bonded with the first layer;
wherein
optionally, at least one of the core and surface of an outer layer comprises a functionalized conductive carbon material.

11. The battery of claim 8, wherein an impedance of the anode is 1000 $\Omega \cdot cm^2$ or less.

12. The battery of claim 8, wherein the nonaqueous electrolyte is a solvent selected from the group consisting of tetrahydrofuran, 2-methyl tetrahydrofuran, dimethoxyethane, glyme, monoglyme, dimethyl glycol, dimethyl ether, diethyl ether, ethyl glyme, diglyme, proglyme, ethyl diglyme, triglyme, butyl diglyme, tetraglyme, polyglyme and highlyme.

13. The negative electrode of claim 2 wherein an average particle size of the magnesium particles is 15 mµ.

14. An electrochemical cell comprising the negative electrode of claim 13.

15. The battery of claim 8, wherein an average particle size of the magnesium particles is 15 mµ.

16. The battery of claim 11, wherein an average particle size of the magnesium particles is 15 mµ.

* * * * *